(12) United States Patent
Seo et al.

(10) Patent No.: US 10,809,664 B2
(45) Date of Patent: Oct. 20, 2020

(54) HOLOGRAPHIC DISPLAY APPARATUS FOR PROVIDING EXPANDED VIEWING WINDOW

(71) Applicant: SAMSUNG ELECTRONICS CO., LTD., Suwon-si (KR)

(72) Inventors: Wontaek Seo, Yongin-si (KR); Juwon Seo, Osan-si (KR); Geeyoung Sung, Daegu (KR); Yuntae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 15/676,336

(22) Filed: Aug. 14, 2017

(65) Prior Publication Data
US 2018/0129166 A1    May 10, 2018

(30) Foreign Application Priority Data
Nov. 10, 2016    (KR) .................. 10-2016-0149565

(51) Int. Cl.
*G03H 1/26*    (2006.01)
*G03H 1/22*    (2006.01)
(Continued)

(52) U.S. Cl.
CPC ........... *G03H 1/268* (2013.01); *G03H 1/2205* (2013.01); *G03H 1/2294* (2013.01); *G02B 1/08* (2013.01);
(Continued)

(58) Field of Classification Search
CPC ........ G03H 1/268; G03H 1/2294; G03H 1/26; G03H 1/2205; G03H 1/2626;
(Continued)

(56) References Cited

U.S. PATENT DOCUMENTS 5,589,956 A * 12/1996 Morishima .............. G02B 5/32
345/7
5,592,313 A *  1/1997 Hart ....................... G02B 5/203
359/24

(Continued)

FOREIGN PATENT DOCUMENTS

KR    10-2011-0005494 A    1/2011
KR    10-2013-0099622 A    9/2013
(Continued)

OTHER PUBLICATIONS

Mishina, et al., 2002, Optical Society of America, vol. 2219, pp. 1489-1499, "Viewing-zone enlargement method for sampled hologram that uses high-order diffraction" (Year: 2002).*
(Continued)

*Primary Examiner* — William R Alexander
*Assistant Examiner* — Tamara Y. Washington
(74) *Attorney, Agent, or Firm* — Sughrue Mion, PLLC

(57) ABSTRACT

A holographic display apparatus for providing an expanded viewing window is provided. The holographic display apparatus includes a spatial filter configured to allow a plurality of holographic images generated by 0th order or higher diffraction in a spatial light modulator to pass therethrough, and an image path conversion element configured to adjust a light path of the plurality of holographic images so that the plurality of holographic images are spaced apart from each other on a focal plane of an optical system.

27 Claims, 12 Drawing Sheets

(51) Int. Cl.
  *G02B 1/08* (2006.01)
  *G02B 27/12* (2006.01)
  *G02B 27/10* (2006.01)
  *G02B 3/00* (2006.01)
  *G02B 5/04* (2006.01)
  *G02B 5/18* (2006.01)
  *H04N 13/351* (2018.01)
  *G02B 30/36* (2020.01)

(52) U.S. Cl.
  CPC ............ *G02B 3/0006* (2013.01); *G02B 5/045* (2013.01); *G02B 5/18* (2013.01); *G02B 5/1814* (2013.01); *G02B 27/106* (2013.01); *G02B 27/1066* (2013.01); *G02B 27/1086* (2013.01); *G02B 27/12* (2013.01); *G02B 30/36* (2020.01); *G03H 2001/221* (2013.01); *G03H 2001/2207* (2013.01); *G03H 2001/2239* (2013.01); *G03H 2001/2242* (2013.01); *G03H 2223/12* (2013.01); *G03H 2223/17* (2013.01); *G03H 2223/18* (2013.01); *G03H 2223/19* (2013.01); *G03H 2223/20* (2013.01); *G03H 2223/23* (2013.01); *G03H 2223/54* (2013.01); *G03H 2223/55* (2013.01); *H04N 13/351* (2018.05)

(58) Field of Classification Search
  CPC ....... G03H 2210/30; G03H 2001/2695; G03H 2001/2242; G03H 2001/2685; G03H 2001/2207; G03H 2001/221; G03H 2223/12; G03H 2223/17; G03H 2223/18; G03H 2223/19; G03H 2223/20; G03H 2223/23; G03H 2223/54; G02B 2027/0118; G02B 2027/0178; G02B 2027/0172; G02B 2027/014; G02B 2027/0174; G02B 5/32; G02B 13/22; G02B 27/22; G02B 27/225; G02B 27/2214; G02B 27/0093; H03H 1/2294; H04N 13/351
  USPC ..................................................... 359/23–32
  See application file for complete search history.

(56) References Cited

U.S. PATENT DOCUMENTS

| | | | | |
|---|---|---|---|---|
| 5,654,782 A * | 8/1997 | Morokawa | ........ | G02F 1/134336 349/143 |
| 6,281,994 B1 * | 8/2001 | Horikoshi | ............ | G03H 1/0248 359/12 |
| 6,771,403 B1 * | 8/2004 | Endo | ...................... | G02B 5/203 359/13 |
| 6,816,290 B2 * | 11/2004 | Mukawa | ................. | G02B 5/32 348/E9.027 |
| 8,325,108 B2 | 12/2012 | Min et al. | | |
| 8,709,078 B1 * | 4/2014 | Friend | ....................... | A61F 2/14 623/5.11 |
| 8,711,455 B2 | 4/2014 | Song et al. | | |
| 9,116,337 B1 | 8/2015 | Miao | | |
| 2006/0152783 A1 * | 7/2006 | Butler | .................. | G11B 7/1372 359/24 |
| 2011/0149018 A1 * | 6/2011 | Kroll | ....................... | G03H 1/02 348/40 |
| 2011/0199459 A1 | 8/2011 | Barenbrug et al. | | |
| 2012/0019908 A1 | 1/2012 | Choi et al. | | |
| 2013/0208328 A1 | 8/2013 | Chae et al. | | |
| 2015/0085331 A1 | 3/2015 | Chae | | |
| 2015/0234350 A1 * | 8/2015 | Park | ..................... | G03H 1/2294 359/9 |
| 2015/0319427 A1 | 11/2015 | Wu | | |
| 2016/0202593 A1 | 7/2016 | Kroll et al. | | |
| 2016/0216691 A1 | 7/2016 | Kim et al. | | |
| 2017/0082976 A1 * | 3/2017 | Schwerdtner | ......... | G03H 1/2205 |
| 2017/0138851 A1 * | 5/2017 | Ashrafi | ................ | G01N 33/487 |
| 2018/0129166 A1 * | 5/2018 | Seo | ........................ | G03H 1/2294 |
| 2018/0306716 A1 * | 10/2018 | Ashrafi | .............. | G01N 21/6486 |
| 2018/0306723 A1 * | 10/2018 | Ashrafi | .............. | G01N 21/6428 |
| 2019/0072899 A1 * | 3/2019 | Kim | ....................... | G02B 30/27 |
| 2019/0094803 A1 * | 3/2019 | Futterer | ............... | G03H 1/0402 |
| 2019/0155033 A1 * | 5/2019 | Gelman | .............. | G03H 1/2205 |
| 2019/0257992 A1 * | 8/2019 | Seo | ........................ | G03H 1/2205 |
| 2020/0073054 A1 * | 3/2020 | Yang | ....................... | H04J 14/04 |

FOREIGN PATENT DOCUMENTS

| | | |
|---|---|---|
| KR | 10-2015-0033501 A | 4/2015 |
| KR | 10-2015-0097029 A | 8/2015 |
| KR | 10-2016-0092716 A | 8/2016 |

OTHER PUBLICATIONS

Mishina et al., "Viewing-zone enlargement method for sampled hologram that uses high-order diffraction", Applied Optics, Optical Society of America, vol. 41, No. 8, Mar. 10, 2002, XP001102391, pp. 1489-1499.

Communication dated Mar. 26, 2018, issued by the European Patent Office in counterpart European application No. 17193263.5.

* cited by examiner

HOLOGRAPHIC DISPLAY APPARATUS FOR PROVIDING EXPANDED VIEWING WINDOW

RELATED APPLICATION

This application claims priority from Korean Patent Application No. 10-2016-0149565, filed on Nov. 10, 2016, in the Korean Intellectual Property Office, the disclosure of which is incorporated herein by reference in its entirety.

BACKGROUND

1. Field

Apparatuses and methods consistent with exemplary embodiments in this disclosure relate to a holographic display apparatus, and more particularly to, holographic display apparatuses that provides an expanded viewing window.

2. Description of the Related Art

In related art, glasses-type methods and non-glasses-type methods are widely used for realizing 3D images. Examples of glasses-type methods include deflected glasses-type methods and shutter glasses-type methods, and examples of non-glasses-type methods include lenticular methods and parallax barrier methods. When using these methods, which use binocular parallax, there is a limit to the number of viewpoints that may be implemented. In addition, these methods make the viewers feel tired due to the difference between the depth perceived by the brain and the focus of the eyes.

Recently, in related art, holographic 3D image display methods, which provide full parallax and are capable of making the depth perceived by the brain consistent with the focus of the eyes, have gradually attracted more attention. According to a related art holographic display technique, when light is irradiated onto a hologram pattern having recorded thereon an interference pattern obtained by interference between the light and object light reflected from an original object, the light is diffracted and an image of the original object is reproduced. When a current holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to the input CGH signal, thereby generating a 3D image. However, in a related art holographic display technique, the viewing window for observing the generated 3D image is narrow because the holographic image is focused on only one point.

SUMMARY

Exemplary embodiments may address at least the above problems and/or disadvantages and other disadvantages not described above. Also, the exemplary embodiments are not required to overcome the disadvantages described above, and an example embodiment may not overcome any of the problems described above.

According to an aspect of an exemplary embodiment, there is provided a holographic display apparatus comprising: a light source configured to provide light; a spatial light modulator configured to form a hologram pattern; and modulate the light from the light source in accordance with the hologram pattern and generate a plurality of holographic images by 0th order or higher diffraction; and an optical system comprising: a spatial filter configured to allow the plurality of holographic images generated by the 0th order or higher diffraction in the spatial light modulator to pass through; and an image path conversion element configured to adjust a light path of at least one of the plurality of holographic images so that the plurality of holographic images are spaced apart from each other on a focal plane of the optical system.

The optical system may further comprise: a first lens arranged between the spatial light modulator and the spatial filter; and a second lens arranged between the spatial filter and the focal plane of the optical system.

The image path conversion element may be arranged between the first lens and the second lens.

The spatial filter may comprise: a first aperture configured to allow a 0th order holographic image generated by the 0th order diffraction to pass through; and a plurality of second apertures configured to respectively allow a plurality of higher order holographic images generated by ±1st order or the higher diffraction to pass through.

The image path conversion element may comprise a plurality of refractive elements respectively arranged in light paths of the plurality of higher order holographic images.

The plurality of refraction elements may be arranged such that a refraction angle of a holographic image increases as an order of the higher order holographic images increases.

The plurality of refractive elements may be arranged in the plurality of second apertures, respectively.

The image path conversion element may be configured such that a center interval between the plurality of holographic images is equal to spot sizes of the plurality of holographic images focused on the focal plane of the optical system.

The second lens may focus a first holographic image, among the plurality of holographic images, at a first location on the focal plane, and may focus a second holographic image, among the plurality of holographic images, at a second location on the focal plane, the second location being different from the first location.

According to an aspect of another exemplary embodiment, there is provided a holographic display apparatus comprising: a light source configured to provide light; a spatial light modulator configured to form a hologram pattern, modulate the light from the light source in accordance with the hologram pattern and generate a holographic image; and an optical system comprising: a spatial filter configured to pass the holographic image; and an image dividing element configured to divide the holographic image into a plurality of sub-holographic images so that the plurality of sub-holographic images are spaced apart from each other on a focal plane of the optical system.

The optical system may further comprise: a first lens arranged between the spatial light modulator and the spatial filter; and a second lens arranged between the spatial filter and the focal plane of the optical system.

The image dividing element may comprise at least one of a diffraction grating for dividing a holographic image by a diffraction phenomenon and a beam displacer for dividing a holographic image by a birefringence phenomenon.

The image dividing element may be arranged between the spatial filter and the second lens or arranged between the second lens and the focal plane of the optical system.

The image dividing element may be provided on a surface of the second lens and may be integrally formed with the second lens.

The spatial filter may comprise an aperture through which the holographic image passes, and the first lens is configured to focus the holographic image on the aperture.

The optical system may further comprise a first lens arranged between the spatial light modulator and the spatial filter.

The image dividing element may be a lens array comprising a plurality of second lenses arranged between the spatial filter and the focal plane of the optical system.

The image dividing element may be configured such that a center interval between the plurality of sub-holographic images is equal to spot sizes of the plurality of sub-holographic images focused on the focal plane of the optical system.

The holographic image may be a 0th order holographic image generated by 0th order diffraction in the spatial light modulation.

According to an aspect of another exemplary embodiment, there is provided a holographic display apparatus comprising: a light source configured to provide light; a spatial light modulator configured to form a hologram pattern; and modulate the light from the light source in accordance with the hologram pattern and generate a holographic image; and an optical system comprising: an image dividing element configured to divide the holographic image into a plurality of sub-holographic images so that the plurality of sub-holographic images are spaced apart from each other on a focal plane of the optical system; and a spatial filter configured to allow the plurality of sub-holographic images to pass through.

The image dividing element may comprise at least one of a diffraction grating for dividing a holographic image by a diffraction phenomenon, a beam displacer for dividing a holographic image by a birefringence phenomenon, and a lens array comprising a plurality of lens elements.

The optical system may further comprise a lens arranged between the spatial light modulator and the spatial filter.

The image dividing element may be arranged between the spatial light modulator and the lens or between the lens and the spatial filter.

The spatial filter may be arranged on the focal plane of the optical system.

The spatial filter may comprise a plurality of apertures arranged to allow only a 0th order sub-holographic image, among the plurality of sub-holographic images, to pass through.

The image dividing element may be configured such that a center interval between the plurality of sub-holographic images is equal to spot sizes of the plurality of sub-holographic images focused on the focal plane of the optical system.

According to an aspect of another exemplary embodiment, there is provided an optical system comprising: a first lens configured to focus a plurality of holographic images generated by a 0th order or higher diffraction on a first focal plane; a spatial filter arranged at the first focal plane and configured to allow the plurality of holographic images to pass through; an image path conversion element configured to adjust a light path of at least one of the plurality of holographic images; and a second lens configured to focus the plurality of holographic images on a second focal plane after the light path of the at least one of the plurality of holographic images is adjusted, the plurality of holographic images are spaced apart from each other on the second focal plane.

According to an aspect of another exemplary embodiment, there is provided an optical system comprising: a first lens configured to focus a holographic image; a spatial filter configured to pass the holographic image; and an image dividing element configured to divide the holographic image into a plurality of sub-holographic images so that the plurality of sub-holographic images are spaced apart from each other on a focal plane of the optical system.

According to an aspect of another exemplary embodiment, there is provided an optical system comprising: an image dividing element configured to divide a holographic image into a plurality of sub-holographic images so that the plurality of sub-holographic images are spaced apart from each other on a focal plane of the optical system; and a spatial filter configured to allow the plurality of sub-holographic images to pass through.

BRIEF DESCRIPTION OF THE DRAWINGS

These and/or other aspects will become apparent and more readily appreciated from the following description of the exemplary embodiments with reference to the accompanying drawings in which.

DETAILED DESCRIPTION

Figure 1:
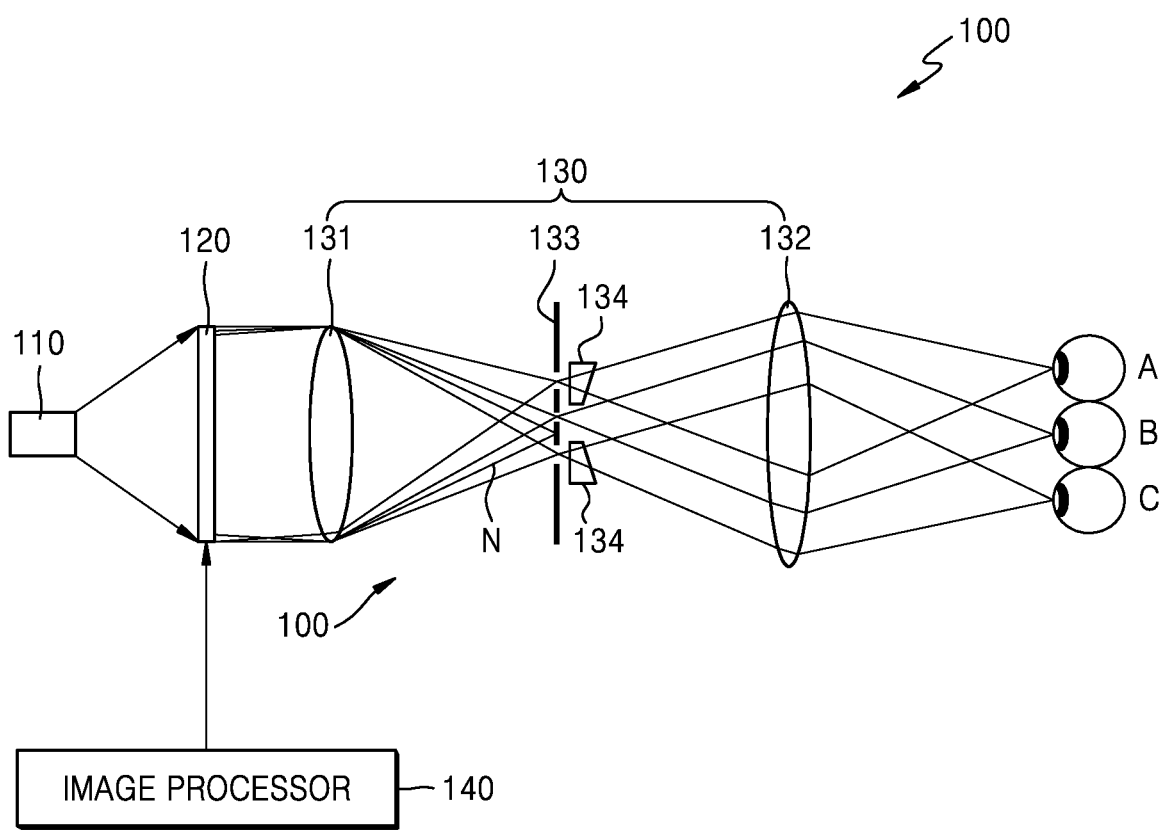
FIG. 1 is a diagram schematically illustrating a configuration of a holographic display apparatus according to an exemplary embodiment.

Hereinafter, with reference to the accompanying drawings, a holographic display apparatus for providing an expanded viewing window will be described in detail. In some exemplary embodiments, the holographic display apparatus may provide an expanded viewing window when reproducing a holographic image via an off-axis technique.

Like reference numerals refer to like elements throughout, and in the drawings, sizes of elements may be exaggerated for clarity and convenience of explanation. The exemplary embodiments described below are merely exemplary, and various modifications may be possible from the exemplary embodiments. In a layer structure described below, an expression "above" or "on" may include not only "immediately on in a contact manner" but also "on in a non-contact manner". As used herein, the term "and/or" includes any and all combinations of one or more of the associated listed items.

FIG. 1 is a diagram schematically illustrating a configuration of a holographic display apparatus 100 according to an exemplary embodiment. Referring to FIG. 1, the holographic display apparatus 100 according to an exemplary embodiment may include a light source 110 for providing light, a spatial light modulator 120 for forming a hologram pattern for modulating incident light to reproduce a holographic image, and an optical system 130 for focusing the holographic image on a space.

The light source 110 may include a laser providing light having high coherency to the spatial light modulator 120. However, if the light incident on the spatial light modulator 120 has at least a certain level of spatial coherence, since the light may be sufficiently diffracted and modulated by the spatial light modulator 120, a light-emitting diode (LED) may be used as the light source 110. In addition to the LED, any of other light sources may be used as long as light having spatial coherence is emitted. Although one light source 110 is illustrated in FIG. 1 for convenience of description, the light source 110 may include an array of a plurality of lasers or LEDs.

The spatial light modulator 120 may form a hologram pattern for diffracting and modulating the incident light, according to a hologram data signal provided by an image processor 140. In an exemplary embodiment, the image processor may be included in the holographic display apparatus 100. In another exemplary embodiment, the image processor may not be part of the holographic display apparatus 100. The spatial light modulator 120 may use any one of a phase modulator for performing phase modulation, an amplitude modulator for performing amplitude modulation, and a complex modulator performing both phase modulation and amplitude modulation. Although the spatial light modulator 120 of FIG. 1 is a transmissive spatial light modulator, a reflective spatial light modulator may also be used. The transmissive spatial light modulator may use, for example, a semiconductor modulator based on a compound semiconductor such as GaAs, or a liquid crystal device (LCD). The reflective spatial light modulator may use, for example, a digital micromirror device (DMD), liquid crystal on silicon (LCoS) technology, or a semiconductor modulator.

The optical system 130 may focus light diffracted and modulated by the spatial light modulator 120 so that a holographic image is reproduced on a predetermined space. To this end, to focus incident light onto a focal plane, the optical system 130 may include a first lens 131 and a second lens 132. In addition, the optical system 130 may be configured to expand a viewing window, i.e., a space for observing a holographic image. To this end, the optical system 130 may further include a spatial filter 133 configured to allow a plurality of holographic images generated by 0th order or higher diffraction in the spatial light modulator 120 to pass through, and an image path conversion element 134 for adjusting light paths of one or more of the plurality of holographic images so that the images are spaced apart from each other on a focal plane of the optical system 130. The first lens 131 may be disposed between the spatial light modulator 120 and the spatial filter 133, and the second lens 132 may be disposed between the focal plane of the optical system 130 and the spatial filter 133.

According to an exemplary embodiment, after the light path of the one or more of the plurality of holographic images are adjusted, a holographic image, among the plurality of holographic images, corresponding to the $0^{th}$ order diffraction may be reproduced having a focal point at location B. Also, other holographic images, among the plurality of holographic images, corresponding to the higher order diffraction may be reproduced having focal points at locations A or C, respectively.

Operation of the holographic display apparatus 100 will now be described below. The image processor 140 may generate a hologram data signal and provide the hologram data signal to the spatial light modulator 120. The hologram data signal may be a computer-generated hologram (CGH) signal computed to reproduce a target holographic image on a space. The image processor may generate the hologram data signal according to a holographic image to be reproduced. The spatial light modulator 120 may form a hologram pattern on a surface of the spatial light modulator 120 according to the hologram data signal provided from the image processor. A principle of the spatial light modulator 120 forming the hologram pattern may be the same as a principle of, for example, a display panel displaying an image. For example, the hologram pattern may be displayed on the spatial light modulator 120 as an interference pattern including information regarding the holographic image to be reproduced.

Simultaneously, the light source 110 may provide the light to the spatial light modulator 120. The light incident on the spatial light modulator 120 may be diffracted and interfered with by the hologram pattern formed by the spatial light modulator 120. Then, the diffracted and interfered light may be focused on the focal plane of the optical system 130, and a three-dimensional holographic image may be reproduced on a predetermined space in front of the spatial light modulator 120. A shape and a depth of the holographic image to be reproduced may be determined according to the hologram pattern formed by the spatial light modulator 120.

However, the spatial light modulator 120 that performs one of a phase modulation and an amplitude modulation may be configured with an array of a plurality of pixels, and thus the array of the plurality of pixels may function as a lattice. Thus, the incident light may be diffracted and interfered with not only by the hologram pattern formed by the spatial light modulator 120 but also by the pixel lattice configured with the array of the pixels of the spatial light modulator 120. In addition, some of the incident light may not be diffracted by the hologram pattern, but may pass through the spatial light modulator 120 as it is. As a result, a plurality of lattice spots may appear on the focal plane of the optical system 130 on which the holographic image is converged to a point. The plurality of lattice spots may function as image noise that degrades quality of the holographic image and makes it uncomfortable to observe the holographic image.

According to an exemplary embodiment, to prevent the plurality of lattice spots from being seen by the observer, the holographic image may be reproduced via an off-axis technique so that a spot of the holographic image is reproduced while avoiding the plurality of lattice spots. The plurality of lattice spots are generated due to an internal structure of the spatial light modulator 120 and are unrelated to the hologram pattern, and thus positions of the plurality of lattice spots are always fixed. However, a spot position of the holographic image may be determined according to the hologram pattern, and thus the hologram pattern may be formed such that the holographic image is reproduced at a position where the plurality of lattice spots are not present.

Figure 2:
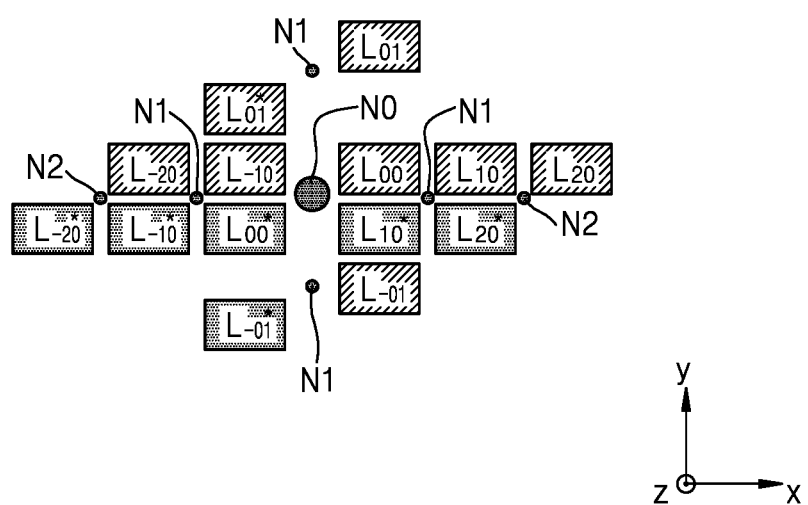
FIG. 2 is a conceptual diagram for explaining a principle of reproducing a holographic image via an off-axis technique according to an exemplary embodiment.

For example, FIG. 2 is a conceptual diagram for explaining a principle of reproducing a holographic image via an off-axis technique according to an exemplary embodiment. Referring to FIG. 2, one lattice spot N0 at the center is generated due to 0th order diffraction by a pixel lattice of the spatial light modulator 120, and a plurality of lattice spots N1 and N2 at the periphery are generated due to ±1st order and ±2nd order diffraction by the pixel lattice of the spatial light modulator 120. In FIG. 2, an image denoted by $L_{00}$ is a holographic image generated due to 0th order diffraction by the hologram pattern formed by the spatial light modulator 120, images denoted by $L_{01}$, $L_{-01}$, $L_{10}$ and $L_{-10}$ are holographic images generated due to ±1st order diffraction by the hologram pattern formed by the spatial light modulator 120, and images denoted by $L_{20}$ and $L_{-20}$ are holographic images generated due to ±2nd order diffraction by the hologram pattern formed by the spatial light modulator 120. When a hologram pattern is formed without considering the lattice spots N0, N1, and N2, the lattice spots N0, N1, and N2 are positioned at spot centers of the reproduced holographic images $L_{00}$, $L_{01}$, $L_{-01}$, $L_{10}$, $L_{-10}$, $L_{20}$, and $L_{-20}$. As a result, a noise image of the lattice spots N0, N1, and N2 and the holographic images $L_{00}$, $L_{01}$, $L_{-01}$, $L_{10}$, $L_{-10}$, $L_{20}$ and $L_{-20}$ may be seen together.

Therefore, the holographic images $L_{00}$, $L_{01}$, $L_{-01}$, $L_{10}$, $L_{-10}$, $L_{20}$, and $L_{-20}$ may be formed so as to prevent the lattice spots N0, N1, and N2 from being seen by the observer. For example, as shown in FIG. 2, spots of the holographic image $L_{00}$, $L_{01}$, $L_{-01}$, $L_{10}$, $L_{10}$, $L_{20}$, and $L_{-20}$ may be moved by $\Delta x$ in an x-direction and by $\Delta y$ in a y-direction. To adjust spot positions of the holographic images $L_{00}$, $L_{01}$, $L_{-01}$, $L_{10}$, $L_{-10}$, $L_{20}$, and $L_{-20}$ by using the above-described method, the spatial light modulator 120 may further form a periodic diffraction pattern adjusting the spot positions of the holographic images $L_{00}$, $L_{01}$, $L_{-01}$, $L_{10}$, $L_{-10}$, $L_{20}$, and $L_{-20}$, in addition to a hologram pattern including information regarding a holographic image to be reproduced. A traveling direction of the incident light is deflected by the periodic diffraction pattern formed by the spatial light modulator 120, and thus the spot positions of the holographic images $L_{00}$, $L_{01}$, $L_{-01}$, $L_{10}$, $L_{-10}$, $L_{20}$, and $L_{-20}$ may deviate from the lattice spots N0, N1, and N2. When moving the spot positions of the holographic images $L_{00}$, $L_{01}$, $L_{-01}$, $L_{10}$, $L_{-10}$, $L_{20}$, and $L_{-20}$ in this way, a complex conjugate image denoted by * may be displayed at a symmetric position of the holographic image $L_{00}$, $L_{01}$, $L_{-01}$, $L_{10}$, $L_{-10}$, $L_{20}$, and $L_{-20}$ based on the lattice spots N0, N1, and N2.

Referring back to FIG. 1, the spatial filter 133 may be configured to block a lattice spot N and a complex conjugate image and allow only a plurality of holographic images to pass through. Thereby, a noise image produced due to the lattice spot N and the complex conjugate image is not visible or is less visible to the observer. For example, the spatial filter 133 may include a plurality of apertures for allowing a plurality of holographic images to pass through. In an exemplary embodiment, the spatial filter 133 may block a noise image produced due to the lattice spot N. When the spatial filter 133 is positioned on the focal plane of the first lens 131, positions of the plurality of apertures of the spatial filter 133 may coincide with the spot positions of the plurality of holographic images.

The image path conversion element 134 serves to separate a plurality of holographic images focused on the focal plane of the optical system 130 by the second lens 132, without centralizing the plurality of holographic images to one point. For example, the image path conversion element 134 may include a plurality of refraction elements that refract incident light to obliquely change the path of the light. Although FIG. 1 shows an example in which the image path conversion element 134 is placed between the spatial filter 133 and the second lens 132, the position of the image path conversion element 134 is not limited thereto. For example, the image path conversion element 134 may be placed in the light path of the plurality of holographic images at any location between the first lens 131 and the second lens 132.

Figure 3:
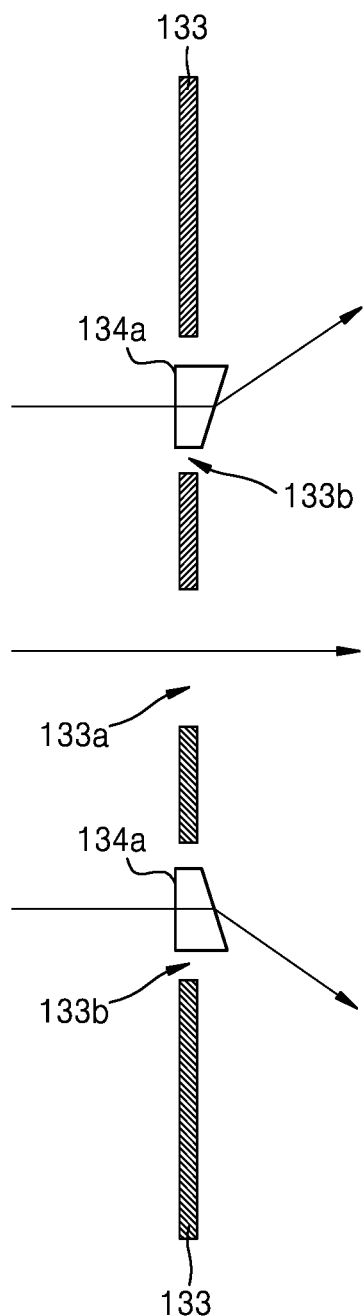
FIGS. 3 through 5 are diagrams schematically illustrating various examples of placement between a spatial filter and an image path conversion element according to one or more exemplary embodiments.
Figure 4:
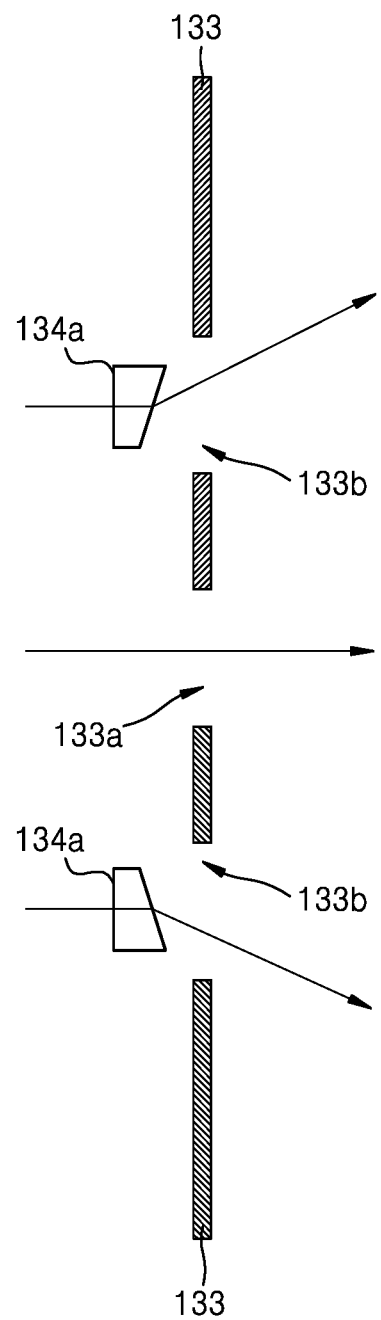
Figure 5:
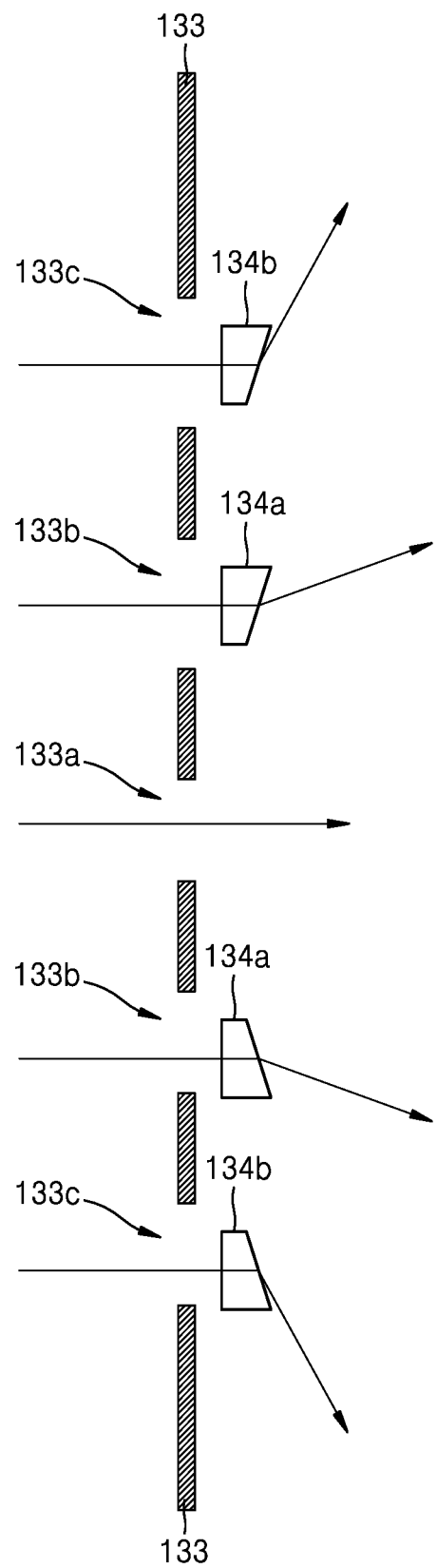

For example, FIGS. 3 through 5 schematically illustrate various examples of placement between the spatial filter 133 and the image path conversion element 134.

Referring to FIG. 3, the spatial filter 133 may include a first aperture 133a for passing a 0th order holographic image generated by 0th order diffraction, and a plurality of second apertures 133b for passing a plurality of higher order holographic images generated by ±1st order or higher diffraction. The image path conversion element 134 may include a plurality of refractive elements 134a respectively placed in the plurality of second apertures 133b. No refractive element may be disposed in the first aperture 133a. Accordingly, the image path conversion element 134 may change the light path of the higher order holographic images to move in a direction away from the light path of the 0th order holographic image without changing the light path of the 0th order holographic image.

Referring to FIG. 4, the image path conversion element 134 may include a plurality of refractive elements 134a arranged to face the plurality of second apertures 133b, respectively, between the first lens 131 and the spatial filter 133. Alternatively, as shown in FIG. 1, the plurality of refractive elements 134a may be arranged to face the plurality of second apertures 133b, respectively, between the spatial filter 133 and the second lens 132. Accordingly, although the plurality of refractive elements 134a may be respectively arranged on the light paths of a plurality of higher order holographic images without any particular limitation, it may be advantageous for the plurality of refractive elements 134a to be positioned in the vicinity of the second apertures 133b of the spatial filter 133 to efficiently separate the plurality of holographic images.

Referring to FIG. 5, a plurality of first and second refractive elements 134a and 134b may be arranged so that a refraction angle of a holographic image increases as the order of the holographic image increases. For example, the spatial filter 133 may include a first aperture 133a for passing a 0th order holographic image generated by 0th order diffraction, a plurality of second apertures 133b for respectively passing a 1st order holographic image generated by ±1st order diffraction, and a plurality of third apertures 133c for respectively passing a 2nd order holographic image generated by ±2nd order diffraction. The image path conversion element 134 may include a plurality of first refractive elements 134a arranged in the vicinity of the second apertures 133b to change the traveling direction of the 1st order holographic image, and a plurality of second refractive elements 134b arranged in the vicinity of the third apertures 133c. Here, a refraction angle of incident light caused by each of the second refraction elements 134b may be greater than a refraction angle of incident light caused by each of the first refraction elements 134a. For example, the second refractive element 134b may include a material having a refractive index higher than that of the first refractive element 134a. Alternatively, the second refractive element 134b may include a prism having a larger inclination angle than the first refractive element 134a. Accordingly, the image path conversion element 134 may change the light path of a plurality of holographic images so that the plurality of holographic images are distant from each other.

Figure 6:
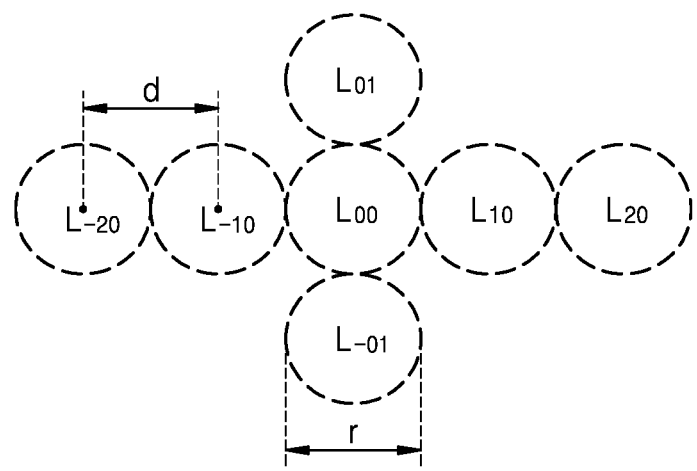
FIG. 6 is a diagram illustrating an arrangement of spots of a plurality of holographic images formed in a focal plane of an optical system according to an exemplary embodiment.

FIG. 6 shows an arrangement of spots of a plurality of holographic images $L_{00}$, $L_{01}$, $L_{-01}$, $L_{10}$, $L_{-10}$, $L_{20}$, and $L_{-20}$ formed in the focal plane of the optical system 130. Referring to FIG. 6, the spots of the plurality of holographic images $L_{00}$, $L_{01}$, $L_{-01}$, $L_{10}$, $L_{-10}$, $L_{20}$, and $L_{-20}$ separated by the image path conversion element 134 may be arranged to abut each other without overlapping each other. To this end, the image path conversion element 134 may make a center interval d between the plurality of holographic images $L_{00}$, $L_{01}$, $L_{-01}$, $L_{10}$, $L_{-10}$, $L_{20}$, and $L_{-20}$ equal to a spot size r of each of the holographic images $L_{00}$, $L_{01}$, $L_{-01}$, $L_{10}$, $L_{-10}$, $L_{20}$, and $L_{-20}$ formed in the focal plane of the optical system 130.

Therefore, since the plurality of holographic images $L_{00}$, $L_{01}$, $L_{-01}$, $L_{10}$, $L_{-10}$, $L_{20}$, and $L_{-20}$ are reproduced at different positions simultaneously on the focal plane of the optical system 130, a space for observing a holographic image, that is, a viewing window of the holographic display apparatus 100, is widened. As a result, the observer may observe the holographic image in a wider area.

Figure 7:
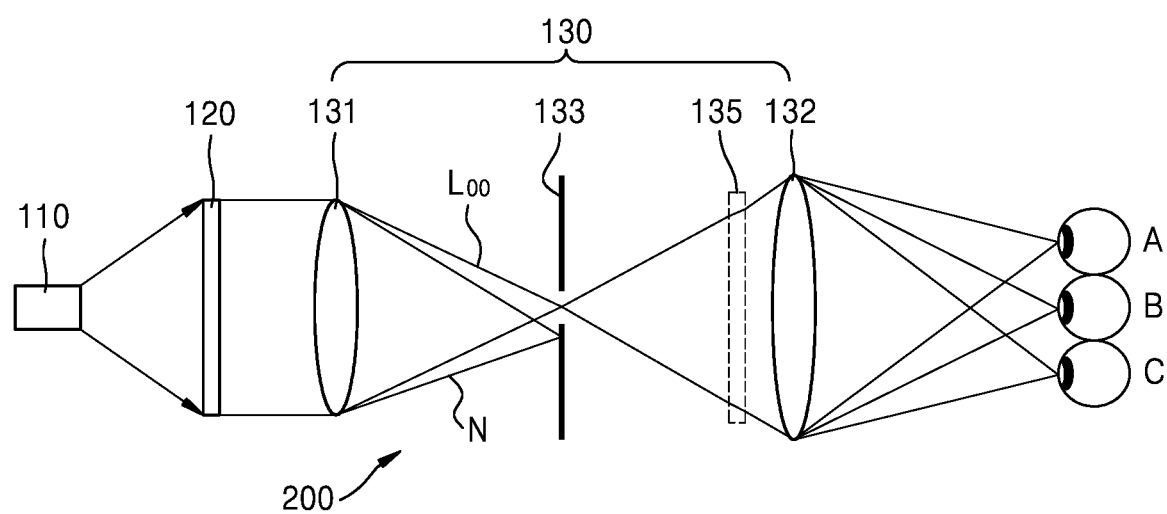
FIG. 7 is a diagram schematically illustrating a configuration of a holographic display apparatus according to another exemplary embodiment.

FIG. 7 is a diagram schematically showing a configuration of a holographic display apparatus 200 according to another exemplary embodiment. Referring to FIG. 7, the holographic display apparatus 200 according to the exemplary embodiment may include a light source 110 for providing light, a spatial light modulator 120 for forming a hologram pattern for modulating incident light to reproduce a holographic image, and an optical system 130 for focusing the holographic image on a space.

The optical system 130 may include a first lens 131 and a second lens 132 to focus light diffracted and modulated by the spatial light modulator 120 onto a focal plane of the optical system 130. Also, the optical system 130 may further include a spatial filter 133 configured to pass a 0th order holographic image generated by 0th order diffraction in the spatial light modulator 120, and a diffraction grating 135 configured to divide the 0th order holographic image into a plurality of sub-holographic images so that the plurality of sub-holographic images are spaced apart from each other on the focal plane of the optical system 130. For example, the diffraction grating 135 may divide one 0th order holographic image into a plurality of sub-holographic images by diffraction.

The first lens 131 may be disposed between the spatial light modulator 120 and the spatial filter 133. The spatial filter 133 may be disposed on a focal plane of the first lens 131. Thus, light diffracted and modulated in the spatial light modulator 120 may be focused onto the spatial filter 133. The spatial filter 133 may include only one aperture 133a that allows only a 0th order holographic image $L_{00}$ to pass through and blocks all other images including a lattice spot N. The aperture 133a may be formed at a spot position of the 0th order holographic image $L_{00}$. Thus, the first lens 131 may focus the 0th order holographic image $L_{00}$ at the aperture 133a.

The diffraction grating 135 may be disposed between the spatial filter 133 and the second lens 132. Thus, the 0th order holographic image $L_{00}$ that has passed through the spatial filter 133 may be divided into a plurality of sub-holographic images by the diffraction grating 135. Then, the plurality of sub-holographic images may be focused onto the focal plane of the optical system 130 by the second lens 132. With the same principle as described with reference to FIG. 6, the diffraction grating 135 may be configured such that a center interval between the plurality of sub-holographic images is equal to the spot sizes of a plurality of sub-holographic images focused on the focal plane of the optical system 130. For example, a traveling direction of a plurality of sub-holographic images separated by the diffraction grating 135 may be determined by a diffraction pattern of the diffraction grating 135, and spot sizes and positions of the plurality of sub-holographic images focused on the focal plane of the optical system 130 may be adjusted by adjusting the position of the diffraction grating 135 between the spatial filter 133 and the second lens 132.

FIGS. 8 through 11 are diagrams showing various modified configurations of the holographic display apparatus 200 shown in FIG. 7 according to one or more exemplary embodiments.

Figure 8:
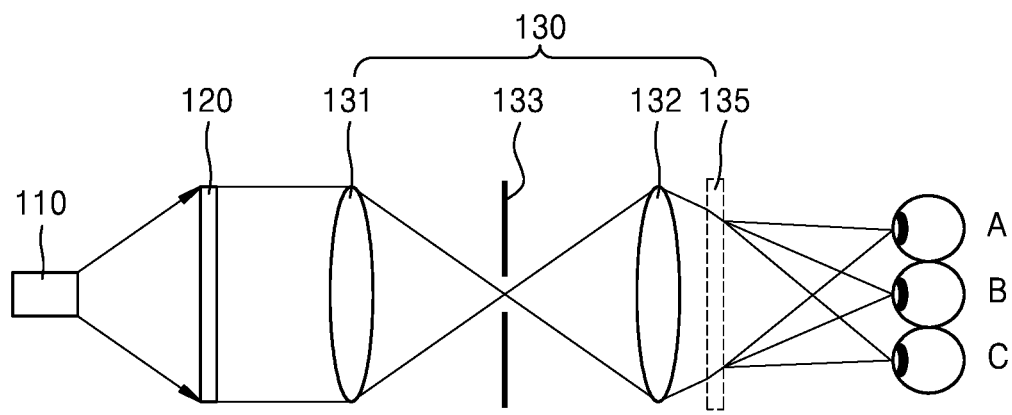
FIGS. 8 through 11 are diagrams illustrating various modified configurations of the holographic display apparatus shown in FIG. 7 according to an exemplary embodiment.

Referring to FIG. 8, the diffraction grating 135 may not be disposed between the spatial filter 133 and the second lens 132, but may be disposed between the focal plane of the optical system 130 and the second lens 132. That is, the diffraction grating 135 may be disposed behind the second lens 132 along a path of light. The diffraction grating 135 may divide a 0th order holographic image focused on the focal plane of the optical system 130 by the second lens 132 into a plurality of sub-holographic images. Although not shown in FIG. 8, a diffraction grating may be further disposed between the spatial filter 133 and the second lens 132 in addition to the diffraction grating 135 disposed between the focal plane of the optical system 130 and the second lens 132. In this case, the two diffraction gratings may be configured to jointly divide a 0th order holographic image into a plurality of sub-holographic images.

Figure 9:
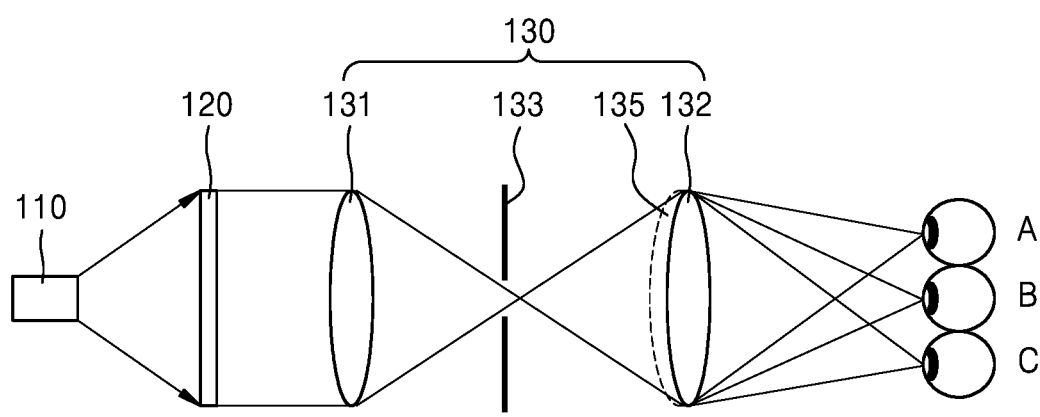

Referring to FIG. 9, the diffraction grating 135 may be disposed on a surface of the second lens 132 and formed integrally with the second lens 132. For example, by forming a diffraction pattern on the surface of the second lens 132, the diffraction grating 135 and the second lens 132 may be manufactured integrally with each other. Although FIG. 9 shows an example in which the diffraction grating 135 is disposed on an incident surface of the second lens 132, the inventive concept is not limited thereto. For example, the diffraction grating 135 may be disposed on an exit surface of the second lens 132. In addition, the diffraction grating 135 may be disposed on both the incident surface and the exit surface of the second lens 132.

Figure 10:
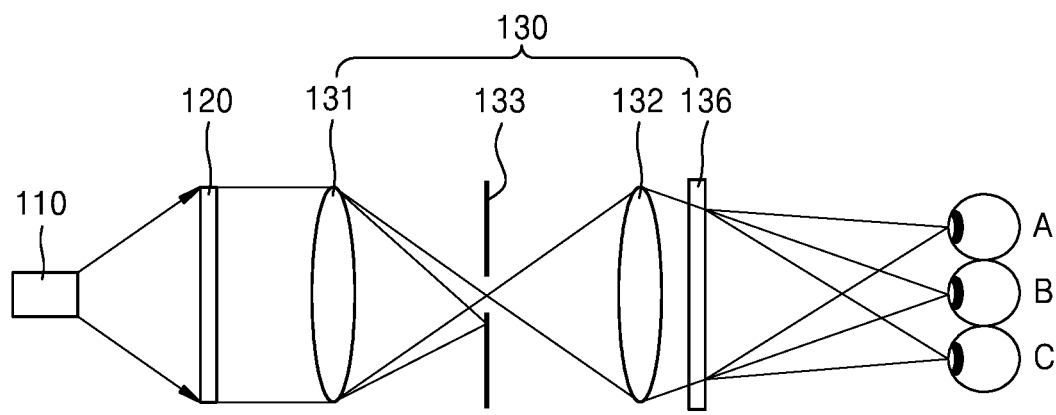

Referring to FIG. 10, the optical system 130 may include a beam displacer 136 instead of the diffraction grating 135. For example, the beam displacer 136 may divide one 0th order holographic image into a plurality of sub-holographic images by a birefringence phenomenon. The description of the diffraction grating 135, provided with reference to FIGS. 7 to 9, may apply to the beam displacer 136. For example, the beam displacer 136 may be disposed between the spatial filter 133 and the second lens 132, or may be disposed between the focal plane of the optical system 130 and the second lens 132. Alternatively, the beam displacer 136 may be disposed between the spatial filter 133 and the second lens 132 and between the focal plane of the optical system 130 and the second lens 132. In addition, the beam displacer 136 may be formed integrally with the second lens 132 on the surface of the second lens 132.

Figure 11:
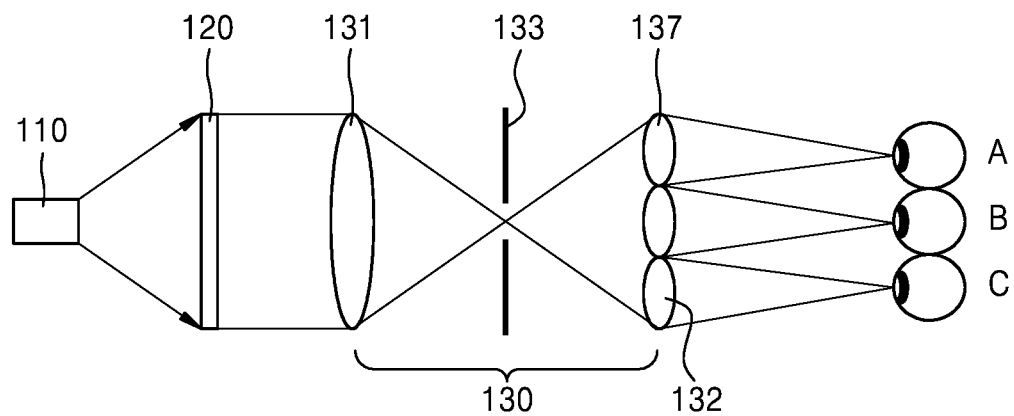

Referring to FIG. 11, the optical system 130 may include the spatial filter 133 configured to pass a 0th order holographic image generated by the 0th order diffraction in the spatial light modulator 120, the first lens 131 disposed between the spatial light modulator 120 and the spatial filter 133, and a lens array 137 including a plurality of second lenses 132 disposed between the focal plane of the optical system 130 and the spatial filter 133. The lens array 137 may divide a 0th order holographic image, which has passed through the spatial filter 133, into a plurality of sub-holographic images, and may also focus the plurality of sub-holographic images on the focal plane of the optical system 130. For example, the 0th order holographic image may be divided by a number of the second lenses 132 arranged in the lens array 137. Although FIG. 11 shows an example in which the plurality of second lenses 132 are arranged only in a height direction, the inventive concept is not limited thereto. For example, the plurality of second lenses 132 may be two-dimensionally arranged in a height direction and a width direction.

The diffraction grating 135, the beam displacer 136, and the lens array 137 all divide one 0th order holographic image into a plurality of sub-holographic images, and thus may be referred to as an image dividing element. As described above, the image dividing element may divide a 0th order holographic image into a plurality of sub-holographic images so that the plurality of sub-holographic images are spaced apart from each other on the focal plane of the optical system 130. For example, the image dividing element may be configured such that the center interval between the plurality of sub-holographic images is equal to the spot sizes of the plurality of sub-holographic images focused on the focal plane of the optical system 130. Particularly, the lens array 137 may perform the role of the image dividing element and the role of the second lens 132 at the same time.

Figure 12:
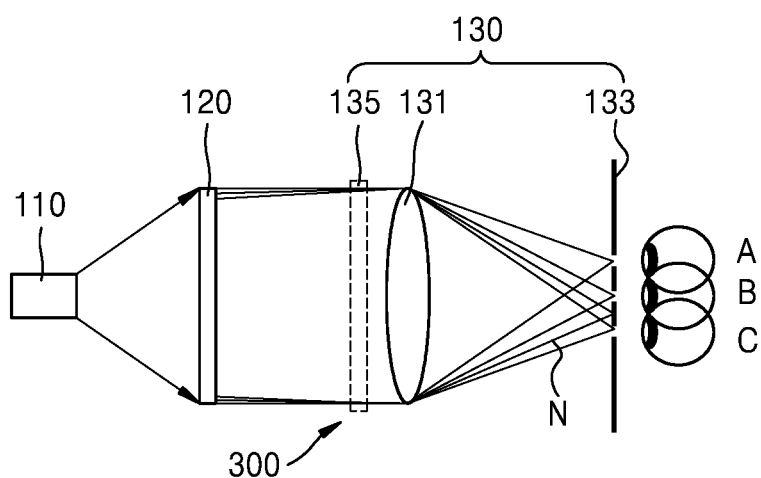
FIG. 12 is a diagram schematically illustrating a configuration of a holographic display apparatus according to another exemplary embodiment.

FIG. 12 is a diagram schematically illustrating a configuration of a holographic display apparatus 300 according to another exemplary embodiment. Referring to FIG. 12, the holographic display apparatus 300 according to the exemplary embodiment may include a light source 110 for providing light, a spatial light modulator 120 for forming a hologram pattern for modulating incident light to reproduce a holographic image, and an optical system 130 for focusing the holographic image on a space.

The optical system 130 may include a diffraction grating 135 configured to divide a holographic image into a plurality of sub-holographic images so that the plurality of sub-holographic images are spaced apart from each other on the focal plane of the optical system 130, and a spatial filter 133 configured to allow the plurality of sub-holographic images to pass therethrough. Also, the optical system 130 may further include a first lens 131 disposed between the spatial light modulator 120 and the spatial filter 133. The first lens 131 is configured to focus a holographic image on the spatial filter 133. To this end, the spatial filter 133 may be disposed on the focal plane of the first lens 131, or may be positioned slightly ahead of the focal plane of the first lens 131 along the traveling direction of light.

Since the diffraction grating 135 is disposed between the spatial light modulator 120 and the spatial filter 133, the diffraction grating 135 of the holographic display apparatus 300 shown in FIG. 12 may divide not only a 0th order holographic image but also higher order holographic images and lattice spots into multiple images. The spatial filter 133 may be configured to transmit only a plurality of 0th order sub-holographic images obtained by dividing the 0th order holographic image. For example, the spatial filter 133 may include a plurality of apertures 133a coinciding with the spot positions of a plurality of 0th order sub-holographic images. Thus, the remaining sub-images formed by dividing the higher order holographic images and the lattice spots may be blocked by the spatial filter 133.

The diffraction grating 135 may be disposed between the spatial light modulator 120 and the first lens 131. The first lens 131 focuses a plurality of sub-images divided by the diffraction grating 135 onto the spatial filter 133. In particular, the first lens 131 may be configured such that a plurality of 0th order sub-holographic images obtained by dividing a 0th order holographic image are focused on the positions of the plurality of apertures 133a of the spatial filter 133.

Since the optical system 130 includes only the first lens 131, the focal plane of the optical system 130 may coincide with the focal plane of the first lens 131. Thus, the spatial filter 133 may be located on the focal plane of the optical system 130 or slightly ahead of the focal plane of the optical system 130 along the travelling direction of light. Then, the observer may place an eye on one of the plurality of apertures 133a of the spatial filter 133 to view a holographic image. In this case, the spot sizes of the plurality of sub-holographic images focused on the plurality of apertures 133a of the spatial filter 133 or slightly beyond the plurality of apertures 133a of the spatial filter 133 may be equal to a center interval between the plurality of sub-holographic images.

FIGS. 13 through 17 are diagrams showing various modified configurations of the holographic display apparatus 300 shown in FIG. 12 according to one or more exemplary embodiments.

Figure 13:
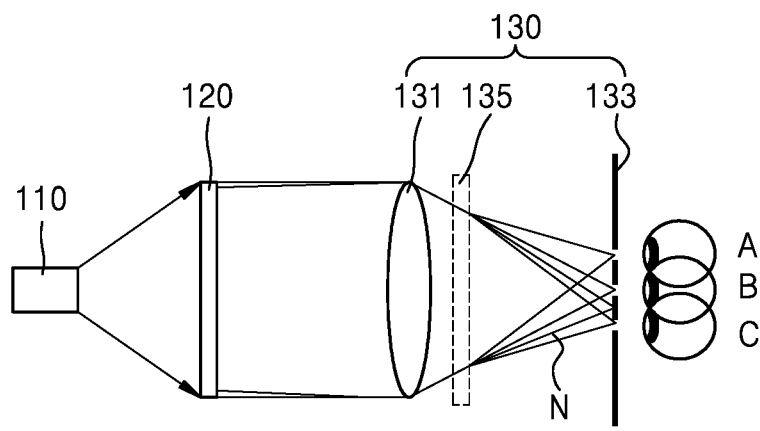
FIGS. 13 through 17 are diagrams illustrating various modified configurations of the holographic display apparatus shown in FIG. 12 according to one or more exemplary embodiments.

Referring to FIG. 13, the diffraction grating 135 may not be disposed between the spatial light modulator 120 and the first lens 131, but may be disposed between the first lens 131 and the spatial filter 133. That is, a diffraction grating 135 may be disposed behind the first lens 131 along the path of light. Thus, the diffraction grating 135 may divide a holographic image focused by the first lens 131 into a plurality of sub-holographic images. Although not shown in FIG. 13, a diffraction grating may be further disposed between the spatial light modulator 120 and the first lens 131 in addition to the diffraction grating 135 disposed between the first lens 131 and the spatial filter 133. In this case, the two diffraction gratings may be configured to jointly divide a holographic image into a plurality of sub-holographic images.

Figure 14:
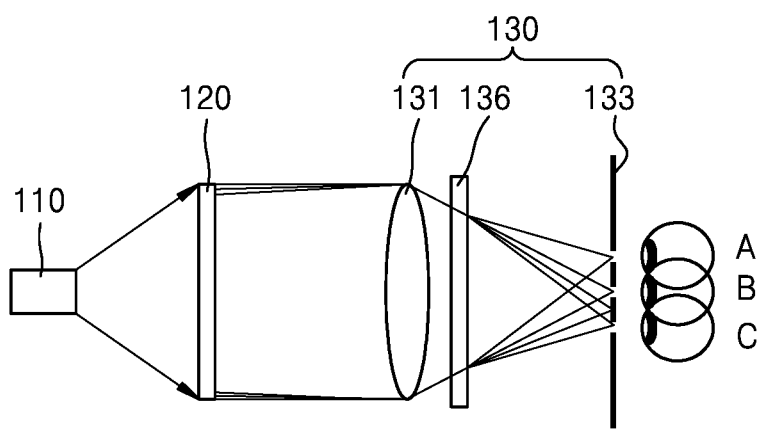

Referring to FIG. 14, the optical system 130 may include the beam displacer 136 instead of the diffraction grating 135. For example, the beam displacer 136 may divide a holographic image into a plurality of sub-holographic images by a birefringence phenomenon. The description of the diffraction grating 135, provided above, may be applied to the beam displacer 136. For example, the beam displacer 136 may be disposed between the first lens 131 and the spatial filter 133, or may be disposed between the spatial light modulator 120 and the first lens 131. Alternatively, the beam displacer 136 may be disposed between the first lens 131 and the spatial filter 133 and between the spatial light modulator 120 and the first lens 131.

Figure 15:
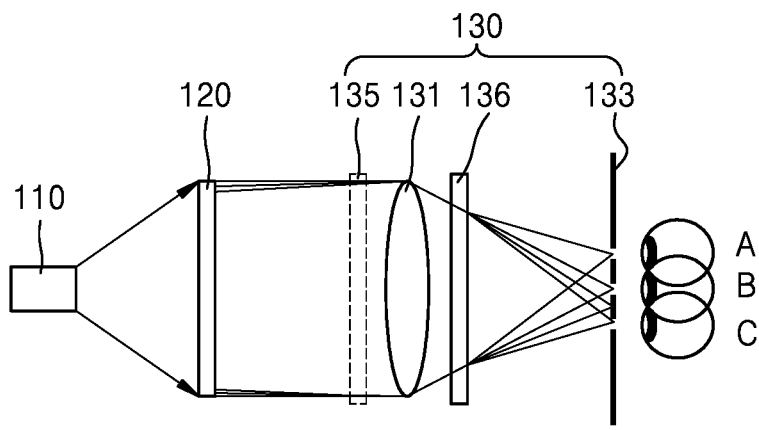

Referring to FIG. 15, the optical system 130 may include both the diffraction grating 135 and the beam displacer 136. In this case, the diffraction grating 135 and the beam displacer 136 may be configured to jointly divide a holographic image into a plurality of sub-holographic images. Although FIG. 15 shows an example in which the diffraction grating 135 is disposed between the spatial light modulator 120 and the first lens 131 and the beam displacer 136 is disposed between the first lens 131 and the spatial filter 133, the inventive concept is not limited thereto. For example, the position of the diffraction grating 135 and the position of the beam displacer 136 may be interchanged.

Figure 16:
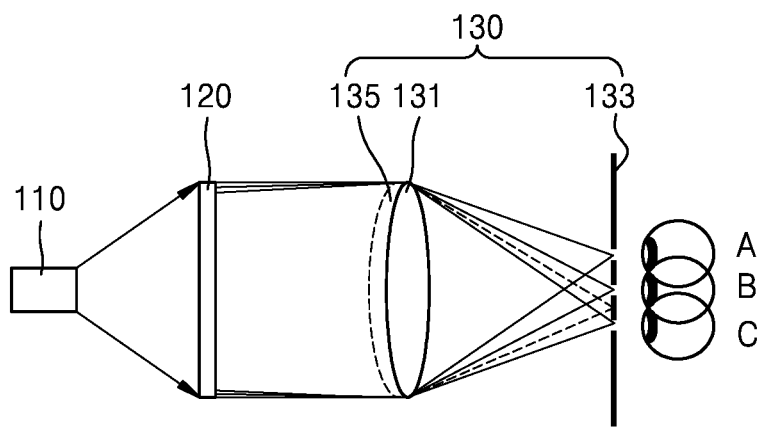

Referring to FIG. 16, the diffraction grating 135 may be disposed on a surface of the first lens 131 and formed integrally with the first lens 131. For example, by forming a diffraction pattern on the surface of the first lens 131, the diffraction grating 135 and the first lens 131 may be integrally manufactured with each other. Although FIG. 16 shows an example in which the diffraction grating 135 is disposed on the incident surface of the first lens 131, the inventive concept is not limited thereto. For example, the diffraction grating 135 may be disposed on the exit surface of the first lens 131. In addition, the diffraction grating 135 may be disposed on both the incident surface and the exit surface of the first lens 131. Instead of the diffraction grating 135, the beam displacer 136 may be formed integrally with the first lens 131. Alternatively, the diffraction grating 135 may be integrally formed on the incident surface of the first lens 131 and the beam displacer 136 may be integrally formed on the exit surface of the first lens 131, or the beam displacer 136 may be formed on the incident surface of the first lens 131 and the diffraction grating 135 may be integrally formed on the exit surface of the first lens 131.

Figure 17:
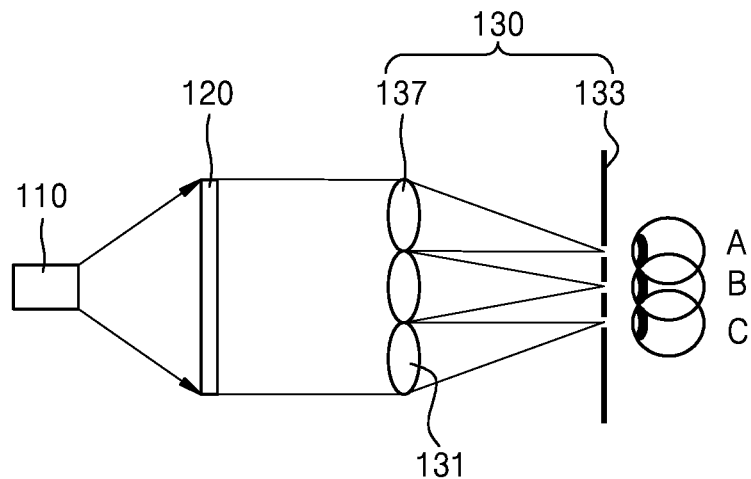

Referring to FIG. 17, the optical system 130 may include the lens array 137 including a plurality of first lenses 131 and the spatial filter 133 positioned on a focal plane of the lens array 137. In this case, the lens array 137 may simultaneously perform the role of an image dividing element for dividing a holographic image into a plurality of sub-holographic images and the role of a lens for focusing the holographic image. The spatial filter 133 may include a plurality of apertures 133a arranged to pass only a 0th order sub-holographic image obtained by dividing a 0th order holographic image from among a plurality of sub-holographic images divided by the lens array 137. In addition, the lens array 137 may be disposed instead of the diffraction grating 135 or the beam displayer 136. For example, the lens array 137 including a plurality of lens elements may be disposed between the first lens 131 and the spatial filter 133.

Figure 18:
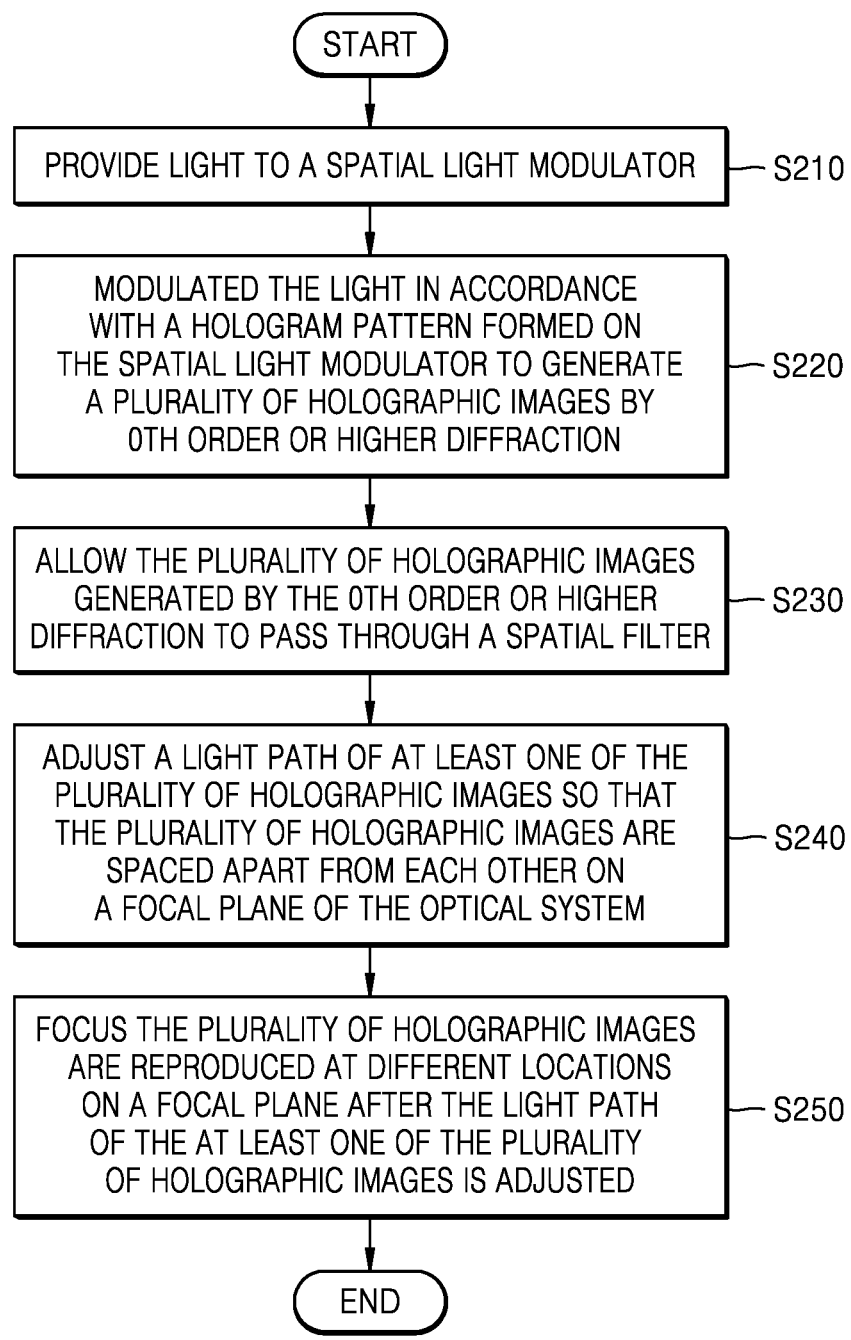
FIG. 18 is a flow chart illustrating a method of reproducing holographic images in a holographic display apparatus according to an exemplary embodiment.

FIG. 18 is a flow chart illustrating an exemplary method of reproducing holographic images in a holographic display apparatus according to an exemplary embodiment. For instance, in S210, a light source may provide light to a spatial light modulator. In S220, the light from the light source may be modulated in accordance with a hologram pattern formed on the spatial light modulator to generate a plurality of holographic images by 0th order or higher diffraction. In S230, the plurality of holographic images generated by the 0th order or higher diffraction may pass through a spatial filter. In S240, a light path of at least one of the plurality of holographic images may be adjusted so that the plurality of holographic images are spaced apart from each other on a focal plane of the optical system. In step S250, the plurality of holographic images are focused at different locations on a focal plane after the light path of the at least one of the plurality of holographic images is adjusted. Thus, an expanded viewing window may be provided for viewing the plurality of holographic images.

In another exemplary embodiment, a holographic image may be divided into a plurality of sub-holographic images so that the plurality of sub-holographic images are spaced apart from each other on a focal plane. The holographic image may be divided by a diffraction phenomenon, a beam displacer for dividing a holographic image by a birefringence phenomenon, or a lens array comprising a plurality of lens elements.

The elements or components described herein may be implemented using hardware components, software components, or a combination thereof. For example, the hardware components may include a processing device. The processing device, such as the image processor or the controller, may be implemented using one or more general-purpose or special purpose computers, such as, for example, a processor, a controller and an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

While the holographic display apparatuses for providing an expanded viewing window, described above, have been shown and described in connection with the exemplary embodiments illustrated in the drawings, it will be understood by those of ordinary skill in the art that various modifications and equivalent embodiments can be made therefrom. Therefore, the disclosed exemplary embodiments should be considered in an illustrative sense rather than a restrictive sense. The range of the embodiments will be in the appended claims, and all of the differences in the equivalent range thereof should be understood to be included in the exemplary embodiments.

What is claimed is:
1. A holographic display apparatus comprising:
a light source configured to provide light;
a spatial light modulator configured to form a hologram pattern, modulate the light from the light source in accordance with the hologram pattern and generate a plurality of holographic images by 0th order or higher diffraction; and
an optical system comprising:
one or more lenses;
a spatial filter configured to allow the plurality of holographic images generated by the 0th order or higher diffraction in the spatial light modulator to pass through; and
an image path conversion element configured to adjust a light path of at least one of the plurality of holographic images so that the plurality of holographic images are spaced apart from each other on a focal plane of the optical system based on the image path conversion element and the one or more lenses,
wherein the spatial filter comprises:
a first aperture configured to allow a 0th order holographic image generated by the 0th order diffraction to pass through; and
a plurality of second apertures configured to respectively allow a plurality of higher order holographic images generated by ±1st order or the higher diffraction to pass through.
2. The holographic display apparatus of claim 1, wherein the one or more lenses of the optical system further comprises:
a first lens arranged between the spatial light modulator and the spatial filter; and
a second lens arranged between the spatial filter and the focal plane of the optical system.

3. The holographic display apparatus of claim 2, wherein the image path conversion element is arranged between the first lens and the second lens.

4. The holographic display apparatus of claim 1, wherein the image path conversion element comprises a plurality of refractive elements respectively arranged in light paths of the plurality of higher order holographic images.

5. The holographic display apparatus of claim 4, wherein the plurality of refraction elements are arranged such that a refraction angle of a holographic image increases as an order of the higher order holographic images increases.

6. The holographic display apparatus of claim 4, wherein the plurality of refractive elements are arranged in the plurality of second apertures, respectively.

7. The holographic display apparatus of claim 1, wherein the image path conversion element is configured such that a center interval between the plurality of holographic images is equal to spot sizes of the plurality of holographic images focused on the focal plane of the optical system.

8. The holographic display apparatus of claim 2, wherein the second lens focuses a first holographic image, among the plurality of holographic images, at a first location on the focal plane, and focuses a second holographic image, among the plurality of holographic images, at a second location on the focal plane, the second location being different from the first location.

9. The holographic display apparatus of claim 1, wherein the image path conversion element is arranged adjacent to at least one aperture among the first aperture and the plurality of second apertures in the spatial filter and is further configured to adjust the light path of the at least one of the plurality of holographic images after the plurality of holographic images passes through the spatial filter.

10. The holographic display apparatus of claim 1, wherein the image path conversion element is arranged adjacent to at least one aperture among the first aperture and the plurality of second apertures in the spatial filter and is further configured to adjust the light path of the at least one of the plurality of holographic images before the plurality of holographic images passes through the spatial filter.

11. The holographic display apparatus of claim 1, wherein the image path conversion element is arranged in at least one aperture among the first aperture and the plurality of second apertures in the spatial filter and is further configured to adjust the light path of the at least one of the plurality of holographic images while the plurality of holographic images passes through the spatial filter.

12. The holographic display apparatus of claim 1, wherein the spatial light modulator includes a pixel array functioning as a lattice that diffracts the light from the light source and generates image noise, and the spatial light modulator is configured to form the hologram pattern such that spot positions of the holographic images deviate from lattice image spots generated by the lattice.

13. The holographic display apparatus of claim 1, wherein the plurality of holographic images, which are spaced apart from each other, are simultaneously reproduced.

14. A holographic display apparatus comprising:
a light source configured to provide light;
a spatial light modulator configured to form a hologram pattern; and modulate the light from the light source in accordance with the hologram pattern and generate a holographic image; and
an optical system comprising:
one or more lenses;
a spatial filter configured to pass the holographic image; and
an image dividing element configured to divide the holographic image into a plurality of sub-holographic images so that the plurality of sub-holographic images are spaced apart from each other on a focal plane of the optical system based on the image path conversion element and the one or more lenses,
wherein the one or more lenses of the optical system further comprises:
a first lens arranged between the spatial light modulator and the spatial filter; and
a second lens arranged between the spatial filter and the focal plane of the optical system.

15. The holographic display apparatus of claim 14, wherein the image dividing element comprises at least one of a diffraction grating for dividing a holographic image by a diffraction phenomenon and a beam displacer for dividing a holographic image by a birefringence phenomenon.

16. The holographic display apparatus of claim 14, wherein the image dividing element is arranged between the spatial filter and the second lens or arranged between the second lens and the focal plane of the optical system.

17. The holographic display apparatus of claim 14, wherein the image dividing element is on a surface of the second lens and integrally formed with the second lens.

18. The holographic display apparatus of claim 14, wherein the spatial filter comprises an aperture through which the holographic image passes, and the first lens is configured to focus the holographic image on the aperture.

19. The holographic display apparatus of claim 14, wherein the image dividing element is configured such that a center interval between the plurality of sub-holographic images is equal to spot sizes of the plurality of sub-holographic images focused on the focal plane of the optical system.

20. The holographic display apparatus of claim 14, wherein the holographic image is a 0th order holographic image generated by 0th order diffraction in the spatial light modulation.

21. A holographic display apparatus comprising:
a light source configured to provide light;
a spatial light modulator configured to form a hologram pattern; and modulate the light from the light source in accordance with the hologram pattern and generate a holographic image; and
an optical system comprising:
one or more lenses;
a spatial filter configured to pass the holographic image; and
an image dividing element configured to divide the holographic image into a plurality of sub-holographic images so that the plurality of sub-holographic images are spaced apart from each other on a focal plane of the optical system based on the image path conversion element and the one or more lenses,
wherein the one or more lenses of the optical system further comprises a first lens arranged between the spatial light modulator and the spatial filter, and
wherein the image dividing element is a lens array comprising a plurality of second lenses arranged between the spatial filter and the focal plane of the optical system.

22. A holographic display apparatus comprising:
a light source configured to provide light;

a spatial light modulator configured to form a hologram pattern; and modulate the light from the light source in accordance with the hologram pattern and generate a holographic image; and an optical system comprising:
one or more lenses;
an image dividing element configured to divide the holographic image into a plurality of sub-holographic images so that the plurality of sub-holographic images are spaced apart from each other on a focal plane of the optical system based on the image dividing element and the one or more lenses; and
a spatial filter configured to allow the plurality of sub-holographic images to pass through,
wherein the spatial filter comprises a plurality of apertures arranged to allow only a 0th order sub-holographic image, among the plurality of sub-holographic images, to pass through.

23. The holographic display apparatus of claim 22, wherein the image dividing element comprises at least one of a diffraction grating for dividing a holographic image by a diffraction phenomenon, a beam displacer for dividing a holographic image by a birefringence phenomenon, and a lens array comprising a plurality of lens elements.

24. The holographic display apparatus of claim 22, wherein the one or more lenses of the optical system further comprises a lens arranged between the spatial light modulator and the spatial filter.

25. The holographic display apparatus of claim 24, wherein the image dividing element is arranged between the spatial light modulator and the lens or between the lens and the spatial filter.

26. The holographic display apparatus of claim 22, wherein the spatial filter is on the focal plane of the one of the one or more lens of optical system.

27. The holographic display apparatus of claim 22, wherein the image dividing element is configured such that a center interval between the plurality of sub-holographic images is equal to spot sizes of the plurality of sub-holographic images focused on the focal plane of the optical system.

* * * * *